United States Patent [19]

Ponce

[11] Patent Number: 4,565,228

[45] Date of Patent: Jan. 21, 1986

[54] STRIKE TEMPLATE FOR A PORTABLE ROUTER

[76] Inventor: Felix C. Ponce, 978 S. Westmoreland Ave., Los Angeles, Calif. 90006

[21] Appl. No.: 614,688

[22] Filed: May 29, 1984

Related U.S. Application Data

[63] Continuation of Ser. No. 494,855, May 16, 1984.

[51] Int. Cl.⁴ .......................... B27F 5/00; B27M 3/00
[52] U.S. Cl. ............................ 144/27; 144/144.5 GT; 33/562
[58] Field of Search ........... 33/174 G; 144/231, 44 R, 144/144.5; 409/79, 125, 130, 182

[56] References Cited

U.S. PATENT DOCUMENTS 3,211,026 10/1965 Calahan ................................. 144/27
3,519,043  7/1970 Guill ....................................... 144/27
3,559,704  2/1971 Thompson ....................... 144/144.5

Primary Examiner—Francis S. Husar
Assistant Examiner—Jorji M. Griffin

[57] ABSTRACT

The present invention is a strike template for use in combination with a hand-held router in order to guide the hand-held router in cutting an opening for a strike on a door jamb. The strike template includes a rectangular base having a substantially rectangular slot with an extended substantially rectangular tongue-cavity, a guide groove in its top surface and a replaceable guide plate disposed in the guide groove and securing mechanism which secures the rectangular base to the door jamb. The rectangular base also has a rectangular groove on its top surface with a pair of flat L-shaped members being disposed within the rectangular groove and being slidably and adjustably coupled thereto in order to vary the width of the opening for the strike. The rectangular base further includes a pair of rectangular grooves which are oppositely disposed from each other on its top surface adjacent the rectangular slot with a pair of flat, rectangular members which are disposed within the pair of rectangular grooves and which are slidably and adjustably coupled to its top surface in order to vary the length of the strike. The strike template also include a position varying mechanism which includes a pair of flat, L-shaped end pieces the changing positions of which adjusts the position of the strike in the door jamb.

4 Claims, 7 Drawing Figures

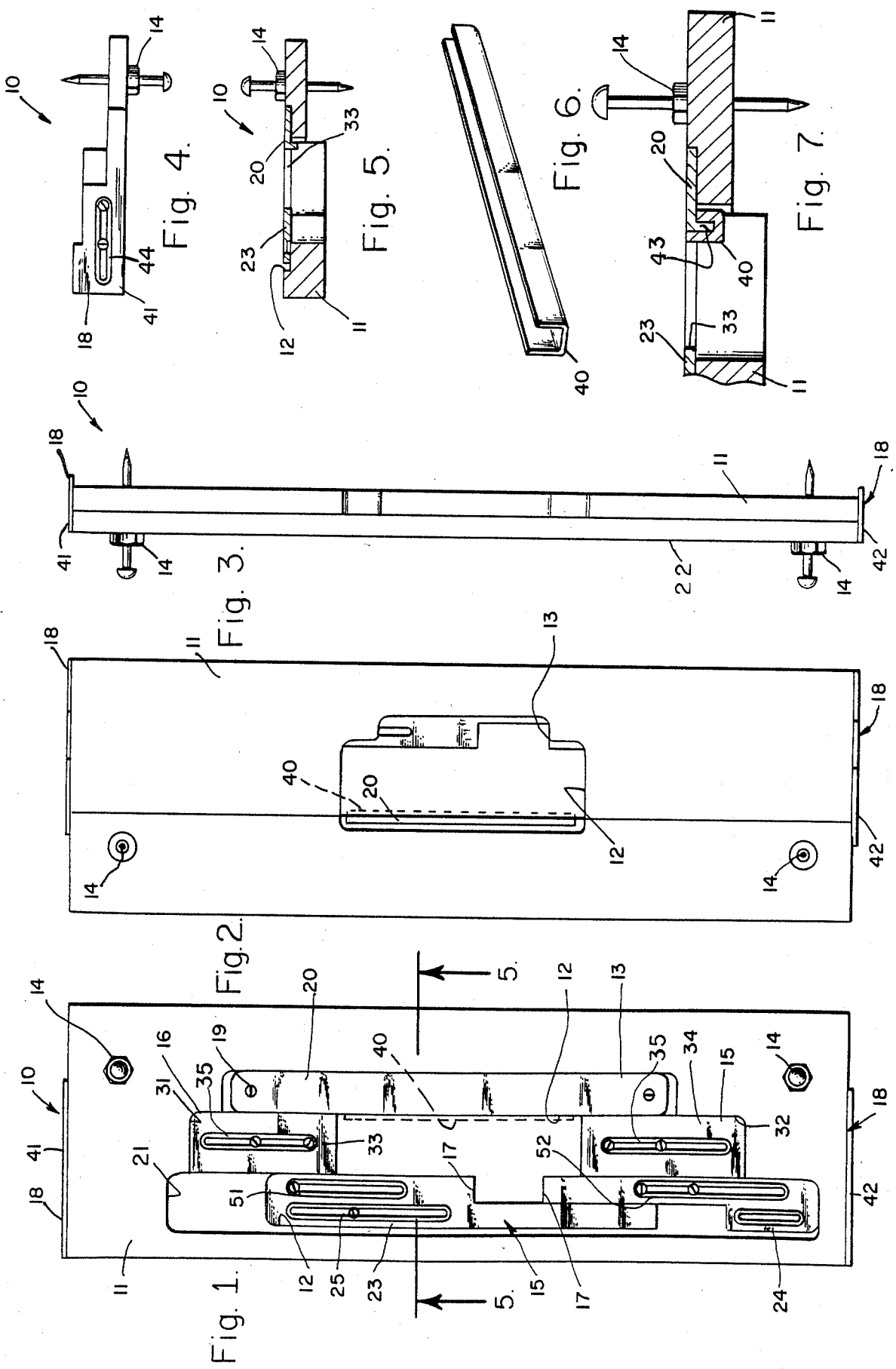

STRIKE TEMPLATE FOR A PORTABLE ROUTER

This is a continuation-in-part of the application, Ser. No. 494,855, filed May 16, 1984.

BACKGROUND OF THE INVENTION

1. Field of the Invention

The present invention relates to a woodworking fixture which is both a work holder and a strike template for use with a portable router and more particularly to a woodworking fixture which holds either a portion of a door or a portion of the door jamb and provides a template for use with a portable router for cutting either a opening for a latch face on the door or an opening for a strike in the door jamb.

2. Description of the Prior Art

Various types of device designed for use with a cutting tool to cut cabinet joints or to shape various pieces of wood have been known. Some of these various fixtures have included clamping devices for holding pieces of wood. Several of the fixtures have included some form of a template for a router to follow in order to provide a surface design or to form certain cuts for an appropriate joint.

U.S. Pat. No. 3,841,368, entitled Routing Device, issued to Nicholas H. Ritter on Oct. 15, 1974, teaches a routing device which has parallel guides on a guide base to position a work piece therebetween, a tool platform to position and support the tool, a tool support plate and a frame to provide angular orientational movement of the tool, and selective indexing mechanisms which are disposed between the parallel guides and the frame, the frame and the blade, and the tool platform and the tool support plate.

U.S. Pat. No. 4,356,849, entitled Molding Curvature Template Fixture, issued to Donald L. Fredrickson on Nov. 2, 1982, teaches a molding curvature template fixture which holds a strip of molding and provides a template for a portable router to follow to shape an end of the strip of molding substantially similar to the cross-sectional shape of the shaped side of the molding. The molding can then fit over the shaped side of an adjacent, perpendicularly disposed strip to form a right angle joint. The fixture includes a box-section frame which has a series of lateral slots and a clamping mechanism. Each slot includes a guiding surface which has a shape substantially similar to the cross-sectional shape of the shaped side of a strip of molding. An insert may be attached to the box section frame to provide a guiding surface for cutting molding which has a non-standard shape.

U.S. Pat. No. 4,323,100, entitled Router Guide, issued to Howard Silken on Apr. 6, 1982, teaches a router guide which has a guide plate for attachment to the base of a router with a central opening for passing the router bit. On the bottom, the guide plate has a series of openings spaced apart along a spiral of progressively increasing radius which has the central opening as its center. A pivot pin is selectively insertable into any one of these openings. The pivot pin has a pointed end for insertion in a workpiece at the center of a circular groove which is to be cut in the workpiece by the router bit as the guide plate is rotated about the pivot pin.

U.S. Pat. No. 4,319,615, entitled Router Attachment for Ornamenting a Workpiece, issued to Henry A. Ditmanson on Mar. 16, 1982, teaches a set of undulatory rails on a track which can be oriented in any given direction by placing the track on a turntable. A wheeled carriage rides to or fro on the track and carries a router. The router bit rises and falls in response to the particular profile of the rails and cuts recesses in an underlying workpiece which has shapes dependent on rail contour, bit size and shape and extent of carriage travel. Turntable indexing capabilities facilitate the reproducibility of complex decorative patterns which are sculptured in the workpiece.

U.S. Pat. No. 4,299,263, entitled Mechanical Router Guide, issued to Charles D. Skinner on Nov. 10, 1981, teaches a fixture which positions and guides a router above the surface of a stationary piece, whereby the router is subject to a composite, three directional movement as it is moved above the workpiece. The indexing table carries a template holding frame which can be slanted at an adjustable angle in relation to the workpiece in order to create designs of varying depth and width into the workpiece.

SUMMARY OF THE INVENTION

In view of the foregoing factors and conditions which are characteristic of the prior art it is the primary object of the present invention to provide a woodworking fixture which holds a portion of the door jamb and provides a template for use with a portable router for cutting an opening for a strike in the door jamb.

In accordance with the present invention an embodiment of a strike template for use in combination with a hand-held router in order to guide the hand-held router in cutting an opening for a strike on a door jamb. The strike template includes a rectangular base having a substantially rectangular slot with an extended substantially rectangular tongue-cavity, a guide groove in its top surface and a replaceable guide plate disposed in the guide groove and securing mechanism which secures the rectangular base to the door jamb. The rectangular base also has a rectangular groove on its top surface with a pair of flat L-shaped members being disposed within the rectangular groove and being slidably and adjustably coupled thereto in order to vary the width of the opening for the strike. The rectangular base further includes a pair of rectangular grooves which are oppositely disposed from each other on its top surface adjacent the rectangular slot with a pair of flat, rectangular members which are disposed within the pair of rectangular grooves and which are slidably and adjustably coupled to its top surface in order to vary the length of the strike. The strike template also includes a position varying mechanism which includes a pair of flat, L-shaped end pieces the changing positions of which adjusts the position of the strike in the door jamb.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE DRAWING

FIG. 1 is a top plan view of a strike template for use with a portable router for cutting an opening for a strike on a door jamb which has been constructed in accordance with the principles of the present invention.

FIG. 2 is a bottom plan view of the strike template of FIG. 1.

FIG. 3 is a side elevation view of the strike template of FIG. 1.

FIG. 4 is an end view of the strike template of FIG. 1.

FIG. 5 is a cross-sectional view of the strike template of FIG. 1 taken along the line 5—5 of FIG. 1.

FIG. 6 is a perspective v,iew of a guide shim which has also been constructed in accordance with the present invention and which may be mechanically coupled to the replaceable guide plate of 23 the strike template of FIG. 1

FIG. 7 is a cross-sectional view of a portion of the strike template of FIG. 1 taken along the line 5—5 of FIG. 1 with guide shim mechanically coupled to the replaceable guide plate.

DESCRIPTION OF THE PREFERRED EMBODIMENT

In order to best understand the present invention it is necessary to refer to the following description of its preferred embodiment in conjunction with the accompanying drawing. Referring to FIG. 1 in conjunction with FIG. 2 and FIG. 3 a strike template 10 for use in combination with a hand-held router in order to guide the hand-held router in cutting a strike opening on a door jamb. The strike template 10 includes a rectangular base 11 having a substantially rectangular slot 12 with an extended substantially rectangular tongue-cavity 13, a securing mechanism 14 which secures the rectangular base 11 to the door jamb and a slot-width varying mechanism 15 which varies the width of the rectangular slot 12 and which is mechanically coupled to the rectangular base 11. The strike template 10 also includes a slot-length varying mechanism 16 which varies the length of the rectangular slot 11 and which is mechanically coupled to the rectangular base 11 and a tongue-cavity width varying mechanism 17 which varies the width of the tongue-cavity 13 and which is mechanically coupled to the rectangular base 11 and a position varying mechanism 18 which varies the lateral position of the strike template 10 on the door jamb and which is mechanically coupled to the rectangular base 11. A guide groove 19 on the top surface 22 of the rectangular strike template 10 which further includes a replaceable guide plate 20 which is disposed in the guide groove and fixedly coupled to the rectangular base 11.

Still referring to FIG. 1 in conjunction with FIG. 2 the slot-width varying mechanism 15 includes a rectangular groove 21 on the top surface 22 of the rectangular base 11 which is disposed adjacent to the rectangular slot 12 and a first L-shaped member 23 and a second L-shaped member 24 both of which are formed from a flat, rectangular bar and which are disposed within the rectangular groove 21 and slidably and adjustably coupled to the top surface 22 of the rectangular base 11 in order to vary the width of the opening for the stike.

Still referring to FIG. 1 in conjunction with FIG. 2 the slot-width varying mechanism 15 also includes a first adjusting mechanism 25 which adjusts the relative positions of the first and second L-shaped members 23 and 24 in order to adjust the width of the opening for the strike on the side of the door jamb. The slot-length varying mechanism 16 includes a first rectangular groove 31 and a second rectangular groove 32, which is oppositely disposed from the first rectangular groove 31, both of which are disposed on the top surface 22 of the rectangular base 11 adjacent to the rectangular slot 12 and a first flat, rectangular member 33 and a second flat, rectangular member 34 both of which are disposed within the first and second rectangular grooves 31 and 32 and slidably and adjustably coupled to the top surface 22 of the rectangular base 11 in order to vary the length of the opening for the strike. The slot-length varying mechanism 16 also includes a second adjusting mechanism 35 which adjusts the positions of the first and second flat, rectangular members 33 and 34 in order to adjust the length of the opening for the strike in the side of the door jamb. Referring to FIG. 4 the position varying mechanism 18 includes a first flat, L-shaped end piece 41 and a second flat, L-shaped end piece 42 and a third adjusting mechanism 44 which adjusts the positions of the first and second flat, L-shaped end pieces 41 and 42 in order to adjust the position of the strike template 10 on the side of the door jamb.

Referring to FIG. 5 in conjunction with FIG. 1 the tongue-cavity width varying mechanism 17 includes a first slot 51 and a second slot 52 on the first and second L-shaped members 23 and 24, respectively, so that that the first and second L-shaped members may be slidably coupled within the rectangular groove 21 in order to vary the width of the tongue-cavity of the opening for the strike.

Referring to FIG. 6 in conjunction with FIG. 1, FIG. 2 and FIG. 7 the strike template 10 further includes a guide shim 40 which is mechanically coupled to a flanged portion 43 of the replaceable guide plate 20 which is disposed in the guide groove 19.

From the foregoing it can be seen that a woodworking fixture for holding a workpiece and providing a strike template for a portable router has been described. It should be noted that the sketches are not drawn to scale and that distances of and between the figures are not to be considered significant.

Accordingly it is intended that the foregoing disclosure and showing made in the drawing shall be considered only as an illustration of the principles of the present invention.

What is claimed is:

1. A strike template for use in combination with a hand-held router in order to guide the hand-held router in cutting an an opening for a strike on a door jamb, said strike template comprising:
   a. a rectangular base having a substantially rectangular slot with an extended substantially rectangular tonguecavity;
   b. a first rectangular groove on said top surface of said rectangular base disposed adjacent said rectangular slot;
   c. a first L-shaped member and a second L-shaped member both of which are formed from a flat, rectangular bar and which are disposed within said rectangular groove and slidably and adjustably coupled to said top surface of said rectangular base in order to vary the width of the opening for the strike;
   d. adjusting means mechanically coupled to said rectangular base, for adjusting the position of said first and second L-shaped members thereby varying the width of said rectangular slot,
   e. a second rectangular groove and a third rectangular groove, which is oppositely disposed from said second rectangular groove, both of which are disposed on said top surface of said rectangular base adjacent said rectangular slot;

f. a first flat, rectangular member and a second flat, rectangular member both of which are disposed within said second and third rectangular grooves and slidably and adjustably coupled to said top surface of said rectangular base in order to vary the length of the strike;

g. adjusting means mechanically coupled to said rectangular base, for adjusting the position of said first and second flat, rectangular members in order to adjust the length of the strike in the side of the door jamb thereby varying the length of said rectangular slot;

d. tongue-cavity width varying means for varying the width of said rectangular tongue-cavity, mechanically coupled to said rectangular base; and e. position varying means for varying the lateral position of said strike template on the door jamb, mechanically coupled to said rectangular base.

f. securing means for securing said rectangular base to the door jamb.

2. A strike template according to claim 1 wherein said position varying means comprises:
 a. a first flat, L-shaped end piece and a second flat, L-shaped end piece; and
 b. adjusting means for adjusting the position of said first flat, L-shaped end piece and a second flat, L-shaped end piece in order to adjust the position of the strike in the side of the door jamb.

3. A strike template according to claim 1 wherein said rectangular base has a guide groove in its top surface and wherein said strike template also comprises a replaceable guide plate which is disposed in said guide groove and fixedly coupled to said rectangular base.

4. A strike template according to claim 3 wherein said strike template has a guide shim which is mechanically coupled to said replaceable guide plate.

* * * * *